Patented Mar. 16, 1926.

1,576,523

UNITED STATES PATENT OFFICE.

JOSEPH M. LOONEY, OF SOMERVILLE, MASSACHUSETTS, ASSIGNOR, BY MESNE ASSIGNMENTS, TO PHILIP A. KOBER, OF HASTINGS-ON-HUDSON, NEW YORK.

DIALYZING AND EVAPORATING MEMBRANES AND PROCESS OF MAKING THE SAME.

No Drawing. Application filed November 23, 1921. Serial No. 517,386.

*To all whom it may concern:*

Be it known that I, JOSEPH M. LOONEY, a citizen of the United States, residing at Somerville, in the county of Middlesex and State of Massachusetts, have invented new and useful Improvements in Dialyzing and Evaporating Membranes and Processes of Making the Same, of which the following is a specification.

This invention relates to the process of making permeable and semi-permeable membranes, which are used for dialysis, pervaporation, and percrystallization and similar uses. Many authors have described various methods of making and applying these membranes of which a fairly complete bibliography may be found in the paper of Bigelow and Gemberling, (Jour. Amer. Chem. Soc., 29, 1576, 1907).

The numerous attempts which have been made to control permeability of these membranes, made of collodion, have not been attended by any marked success. It was early known that these membranes become more impermeable on drying, and this fact was utilized by Bigelow and Gemberling and Malfitano (Zeitschrift fur physikal. Chemie. (1910) LXVIII, 232.) to control the permeability of their membranes. No attempt was made to standardize the membranes made in this way as to the degree of permeability except to state that the longer the membranes were allowed to dry the less permeable they became. Brown, (Biochemical Journal, IX, 591, 1915) describes a method in which the permeability is varied by treating the dry membranes with different strengths of ethyl alcohol.

All the membranes described by these various authors have a common disadvantage in that they become brittle and stiff when permitted to become completely dry and are rendered impermeable and very easily broken. This necessitates the keeping of these membranes under water.

The improved dialyzing and evaporating membranes of my invention are on the other hand extremely flexible even after being allowed to dry for a period of 2 weeks at room temperature and still retain their permeability. Some of these membranes have been rolled up in a ball like a ward of tissue paper without being injured in the slightest as is shown by the fact that when blown out and filled with a saturated solution of ammonium chloride they exhibited a high degree of endosmosis or percrystallization.

This remarkable flexibility in the dried collodion membranes is obtained by adding ethyl acetate to solutions of collodion in mixtures of absolute alcohol and dry ether.

As an example of a specific embodiment of my process, it being understood that my process may be greatly varied within the limits of my invention, I may pursue the following procedure: five to nine grams of negative cotton, a brand of collodion which has been dried for 48 hours over sulfuric acid, is placed in a clean and dry flask or container, and a portion say 25 cc. or more of absolute ethyl alcohol are added, and the flask shaken until the cotton is thoroughly moistened. Then 75 cc. of ether, which has been distilled from sodium, are now added and the flask shaken until the cotton has completely dissolved, when 15 cc. of ethyl acetate are added with shaking to secure complete mixing of the solvents. The solution is allowed to stand over night and then the clear supernatant liquid is decanted off into another flask.

After preparing numerous solutions of varying amounts of solvents, the proportions of solvents given above have been found to give the best results. I found that increasing the amount of ethyl acetate at first increases the flexibility of the resulting membrane rapidly, but that the effect diminishes as the concentration is increased so that the maximum flexibility is reached at a concentration of about 40 per cent. I also found that increasing the concentration of the ethyl acetate diminishes the permeability of the membrane to a slight extent. Acetone also decreases the permeability of the membrane in proportion to its concentration.

Now it is well known the "flexible" collodion of the different pharmacopœias, containing castor oil, are very flexible, but also impermeable. Ethyl acetate and castor oil are alike in that they are both esters of fatty acids. One is soluble in water, ethyl acetate, while castor oil is insoluble. It seems therefore that I have discovered a general and basic method for making permeable and semi-permeable membranes. By using increasingly higher esters, and in different concentrations, I may and can make permeabilities of any desired grade, which have great flexibility and do not become impermeable on drying and can be used anew without further treatment. Therefore this disclosure does not limit itself to ethylacetate mixtures, but to other esters as well, not excluding mixtures of esters.

Heretofore the esters like castor oil have been used to make impermeable membranes, and it seems not to have been known before this disclosure that permeable membranes can be made with esters which are not water repellent, and water insoluble, and that all grades of permeability can be obtained by varying the kind of ester and the concentration thereof.

After the solution of the collodion containing the right amount of ester and other constituents has been prepared, the membranes are prepared as follows:

The mould may be a test tube, Kjeldahl or any other flask or container of any desired size. The solution is poured into the flask, which must be clean and dry, and the excess of collodion is allowed to drain back into the container by holding the flask at an angle of about 60 degrees and slowly rotating it until the collodion no longer drips freely and then the flask is clamped upside down in a stand and left until it is completely dry. Drying may be hastened by blowing a gentle blast of air into the flask, or even better by inserting a tube, connected with a slight suction, into the flask, taking care not to touch the side of the vessel. When the membrane is perfectly dry it is removed by peeling the top of the film from the neck of the flask and then pouring a gentle stream of water between the membrane and the side of the flask or mould. This frees the membrane and it can then be withdrawn. The water brought into contact with the membrane as above noted is absorbed by the membrane to form a gell at once, but an important feature of my invention resides in the fact that my membrane may be completely dried at any time without losing its power to absorb water and to gell, and in this respect my improved method differs from those previously described in that the membrane is allowed to become perfectly dry before placed in contact with water, while in those made heretofore, the membrane must be immersed in water before it dries or it becomes impermeable.

What I claim is:

1. The process of making permeable membranes, which comprises mixing a nitrocellulose with ethyl alcohol, dissolving the nitrocellulose by mixing ether with the aforesaid mixture and agitating adding a water soluble ester, spreading and finally removing the solvent, thus forming a membrane.

2. The process of making a permeable membrane which comprises mixing a nitrocellulose with ethyl alcohol, agitating the mixture, adding ether to said mixture and agitating until the nitrocellulose has been dissolved, adding ethylacetate, spreading and finally removing the solvent, thus forming a membrane.

3. The process of making permeable membranes which comprises mixing about 5 to 9 grams of negative cotton and about 25 cc. of ethyl alcohol, agitating the mixture, adding about 75 cc. of ether, agitating the mixture, adding about 15 cc. of a water soluble ester, and finally moulding the membrane.

Signed.

JOSEPH M. LOONEY.